United States Patent
Eberlein

(10) Patent No.: US 11,973,836 B1
(45) Date of Patent: Apr. 30, 2024

(54) COORDINATED SHUTDOWN OF CLOUD COMPUTING APPLICATIONS WITH SESSION HANDOVER

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/983,045

(22) Filed: Nov. 8, 2022

(51) Int. Cl.
*G06F 15/16* (2006.01)
*H04L 45/00* (2022.01)
*H04L 67/143* (2022.01)
*H04L 67/148* (2022.01)

(52) U.S. Cl.
CPC ............ *H04L 67/148* (2013.01); *H04L 45/22* (2013.01); *H04L 67/143* (2013.01)

(58) Field of Classification Search
CPC ...... H04L 67/148; H04L 67/143; H04L 45/22
USPC ................. 709/202–203, 227–228
See application file for complete search history.

(56) References Cited

U.S. PATENT DOCUMENTS

| | | | |
|---|---|---|---|
| 8,990,893 B2 * | 3/2015 | Greenlee | H04L 63/10 713/168 |
| 9,971,655 B1 * | 5/2018 | Li | G06F 11/1438 |
| 10,230,708 B2 | 3/2019 | Eberlein | |
| 10,348,812 B2 * | 7/2019 | Kumar | H04L 67/1031 |
| 10,659,449 B2 | 5/2020 | Eberlein | |
| 10,992,760 B2 | 4/2021 | Yamamoto | |
| 11,249,812 B2 | 2/2022 | Eberlein et al. | |
| 11,418,550 B1 | 8/2022 | Eberlein et al. | |
| 11,675,930 B2 * | 6/2023 | Buzbee | G06F 11/3656 726/23 |
| 2007/0150602 A1 | 6/2007 | Yared et al. | |
| 2009/0081996 A1 * | 3/2009 | Duggal | H04L 67/306 455/406 |
| 2010/0228819 A1 * | 9/2010 | Wei | H04L 67/1001 709/203 |
| 2016/0094629 A1 * | 3/2016 | Abushaban | H04L 67/1025 709/226 |
| 2016/0277488 A1 * | 9/2016 | Fallon | H04L 67/1031 |

(Continued)

FOREIGN PATENT DOCUMENTS

JP  2012-103879  5/2012

OTHER PUBLICATIONS

Extended European Search Report in European Appln. No. 22208771. 0, dated Sep. 28, 2023, 11 pages.

*Primary Examiner* — Bharat Barot
(74) *Attorney, Agent, or Firm* — Fish & Richardson P.C.

(57) ABSTRACT

In an implementation, a shutdown coordinator sends an instruction to a router to no longer assign new sessions to an application instance, where the application instance is to be shut down. The shutdown coordinator sends a request to the application instance to export associated sessions for handover to a new application instance. The shutdown coordinator receives an indication from the application instance that no further requests can be processed by the application instance since all associated sessions have been exported to an external session storage. The shutdown coordinator instructs the router to redirect requests to the application instance to the new application instance. The shutdown coordinator shuts down the application instance. The shutdown coordinator deletes remaining sessions of all associated sessions from the external session storage after a defined timeout period.

20 Claims, 3 Drawing Sheets

(56) References Cited

U.S. PATENT DOCUMENTS

| | | |
|---|---|---|
| 2016/0373520 A1 | 12/2016 | Kumar et al. |
| 2018/0041568 A1* | 2/2018 | Eberlein ............... H04L 67/142 |
| 2022/0400112 A1* | 12/2022 | Cavalcanti ............ H04L 63/101 |
| 2023/0062052 A1* | 3/2023 | Sheshadri ............. H04L 67/143 |

* cited by examiner

COORDINATED SHUTDOWN OF CLOUD COMPUTING APPLICATIONS WITH SESSION HANDOVER

BACKGROUND

In a cloud computing environment, a variable number of application instances process client requests in parallel. For some events, such as scaling down a deployment where fewer application instances are needed, software maintenance, or availability zone evacuation (in case of datacenter infrastructure issues) some application instances must be shut down and their workload needs to be re-distributed to other instances. Although cloud applications should be completely stateless, which would enable quick session draining, in reality most cloud applications still have some degree of state that is maintained across a long series of requests and therefore an extended period of time. Losing the state information because of a necessary shutdown of an application instance causes disruptions to users and is inefficient.

SUMMARY

The present disclosure describes coordinated shutdown of cloud-computing applications with session handover.

In an implementation, a computer-implemented method, comprises: sending, by a shutdown coordinator and to a router, an instruction to no longer assign new sessions to an application instance, wherein the application instance is to be shut down; sending, by the shutdown coordinator and to the application instance a request to export associated sessions for handover to a new application instance; receiving, by the shutdown coordinator and from the application instance, an indication that no further requests can be processed by the application instance since all associated sessions have been exported to an external session storage; instructing, by the shutdown coordinator and to the router, to redirect requests to the application instance to the new application instance; shutting down, by the shutdown coordinator, the application instance; and deleting, by the shutdown coordinator, remaining sessions of all associated sessions from the external session storage after a defined timeout period.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the proposed solution presents an alternative to the current state of the art of draining sessions before shutting down application instances. Under the state of the art, long-running sessions are problematic, as shutdowns need to happen in a timely manner and sessions that are still running after a defined time goal are simply terminated, causing undesired disruptions. Second, under the new approach, long-running processes can be seamlessly (that is, unnoticed by a user) handed over by moving sticky sessions between application instances. Third, the new approach helps to make the cloud computing environment appear to be always available even though tasks such as software maintenance, lifecycle management, and performing scaling operations need to be performed in the background. Fourth, the described approach permits users to be informed about a currently running session handover, providing a time estimate (for example, a progress bar or graphic indicator) indicating when users can resume work. This is important in case a handover process takes longer than just a few seconds due to the size of a session state.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
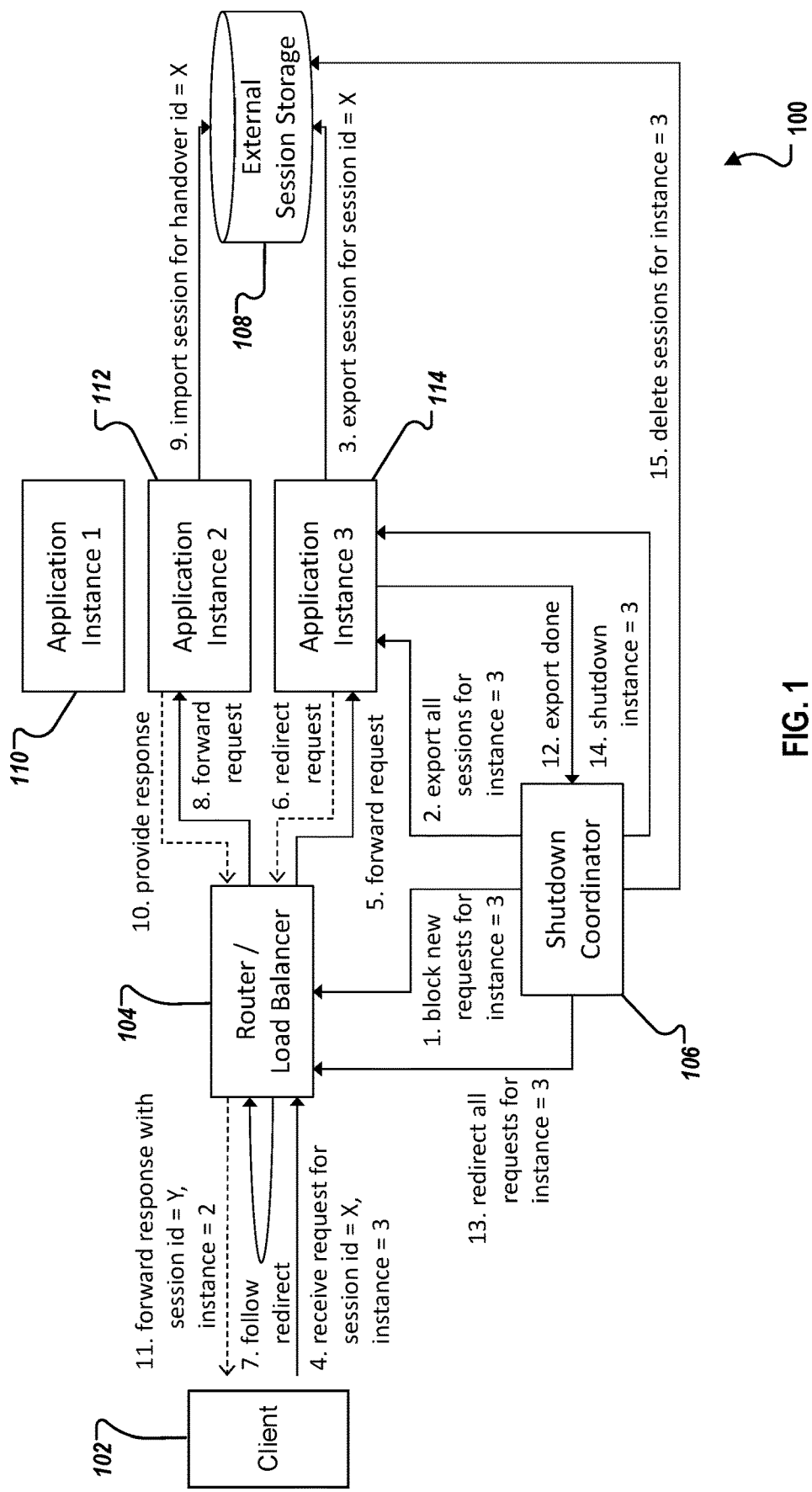
FIG. 1 is a flow chart illustrating an example of a method for coordinated shutdown of cloud-computing applications with session handover and involved components, according to an implementation of the present disclosure.

The following detailed description describes coordinated shutdown of cloud-computing applications with session handover, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In cloud computing, application instances are not handled individually, but collectively. That is, an individual application instance is not considered to be special, because it is similar to any other application instance, and may be started, shut down, deleted, restarted, etc. at any time. The collective consideration of applications in a cloud computing environment is necessary because of various factors.

First, the cloud scales horizontally, i.e., when there is more load, additional application instances are started, so the load is distributed across more instances. On the flipside this means, that application instances may also be shut down if there is more capacity available than needed, to reduce resource consumption and associated costs of superfluous instances.

Second, software updates are applied by replacing full application instances instead of patching processes while they are running, which is the model of traditional on-premise enterprise resource planning (ERP) systems. This "rip-and-replace"-type of approach means that application instances running a new software version are started in parallel with respect to the existing application instances still running an old software version. As soon as there are no more users on older software version instances, they can be shut down. Ideally, this should happen as soon as possible to avoid increased resource consumption/costs due to double the number of software instances running. Sessions are not handed over between older and newer software version software instances unless users end their sessions voluntarily, so unnecessary delay can result from waiting until a user is completed their session.

Third, data centers are organized in isolated failure units called availability zones. Typically, each availability zone has separate hardware, network, power, even cooling. If one availability zone becomes unstable, software can continue to run in the remaining availability zones of the region. But this means that application instances running in an affected availability zone must be shut down and the running workload must be moved to other application instances in different availability zones.

Current software architectures are built with these requirements in mind and, to a large degree, user workload can be moved rather seamlessly between application instances when needed by draining active sessions and shutting down instances once all sessions are gone. However, although cloud applications should be completely stateless, which would enable quick session draining, in reality most applications still have some degree of state that is maintained across a long series of requests (therefore, an extended period of time). For example, an application may have a security session, which would otherwise require the user to re-logon if the session were lost. Other examples could include a draft business state (such as, a business object being edited) or a planning process that is interactively optimized and that would have to be restarted. However, especially in critical situations, such as when an availability zone needs to be urgently evacuated due to a hardware issue, a grace period before the shutdown cannot be sufficiently long enough for applications implementing complex business scenarios to achieve sufficient session draining and to avoid disturbing user work.

In cloud computing, a variable number of application instances process client requests in parallel. As previously described, for some events (such as, scaling down a deployment (less instances needed), software maintenance (for example, deployment), or availability zone evacuation (for example, datacenter infrastructure issues)), some application instances must be shut down and their associated workload redistributed to other application instances. As will be understood by those of ordinary skill in the art, there may be other reasons beyond those listed that require a quick shutdown of application instances.

It is important that shut down and redistribution events be transparent to clients and not introduce noticeable interruptions to active tasks. As each application instance processes hundreds or thousands of sessions, handing them over must be a gradual process, where each individual session handover does not affect parallel processing of other sessions that either have already been handed over or are still to be handed over.

Although cloud applications should be completely stateless, which would enable quick session draining, in reality most cloud applications still have some degree of state that is maintained across a long series of requests and therefore an extended period of time. Losing the state information because of a necessary shutdown of an application instance causes disruptions to users and is inefficient. A solution is needed that allows capturing session states from application sessions and moving them to other application instances that take over workload for respective application sessions.

In some instances, a session state can be very large (for example, in complex ERP applications) and it takes too much time to store the session state to a central location with each request. In other instances, there may be many very small requests that change a session state, so that overhead of preventive session export is too high compared to actual productive work. As a result, simply exporting all data kept in a session state after each request is too inefficient and expensive with respect to performance, resource consumption, and cost, so a more optimized solution is needed that supports session handover only in those events when it is needed.

A distributed state must be preserved and made accessible to a target application instance to which a session is handed over on shutdown. Complex planning and optimization applications execute huge operations across many individual client requests, building up a state that is kept in memory until a certain checkpoint is reached. In a micro services architecture, not all of this state is kept in a user-facing application but, instead, most of the state is kept in upstream services consumed by the application. Therefore, when an application instance needs to be shut down, not only the application instance's own state must be handed over to another target application instance, but associated states in upstream services also need to be preserved and made accessible to the other target application instance to which the application session is handed to.

It is also important that solution implementations be independent of cloud platform infrastructure. There are quite a few cloud computing platform technologies available that provide basic application instance management and client request routing functionality. For at least efficiency and portability, application developers implementing a session handover solution should not need to be aware of a particular cloud computing environment where an application will be deployed. A generic protocol should be implemented that works independently of common cloud platform infrastructures (that is, does not require changes to the cloud platform infrastructures) in order to support the described solution.

Described is a non-brute force solution for cloud computing environments to actively handover sessions instead of passively waiting for the sessions to end. In a brute force solution, all session states are externalized and distributed. However, the described solution hands over sessions only when needed, avoiding a waste of resources and processing overhead of current solutions. The described solution coordinates shutdowns of individual application instances unnoticed by users by handing over sessions of the individual application instances to other application instances instead of losing/terminating the individual application instances. In complex application scenarios (where, for example, long-running planning and optimization applications have built up sessions over several hours), this is an essential capability that enables software maintenance, lifecycle management, and performance scaling operations in the background without disrupting users at any time. At the core of the describe approach is central coordinate session handover, but with distributed and self-regulating responsibilities of involved components.

FIG. 1 is a flow chart illustrating an example of a method 100 for coordinated shutdown of cloud-computing applications with session handover and involved components, according to an implementation of the present disclosure.

FIG. 1 illustrates involved components, including a client 102, Router/Load Balancer 104, Shutdown Coordinator 106, External Session Storage 108, Application Instance 1 110, Application Instance 2 112, and Application Instance 3 114. In some implementations the Router/Load Balancer 104 could be a hyper-scaler or custom service; the Shutdown Coordinator 106 can be a custom software program; the External Session Storage 108 could be an in-memory database, conventional database, object store, or other data structure; and the Application Instances 1-3 (110, 112, and 114) can be Java, Node.js, C/C++, or Rust. In the described example of FIG. 1, it is desired to shut down Application Instance 3 114.

For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 1, the Shutdown Coordinator 106 sends a request to the Router/Load Balancer 104, instructing the Router/Load Balancer to no longer assign new sessions to an application instance to be shut down (in this example, Application Instance 3 114).

In some implementations, the Router/Load Balancer 104 keeps a data map of what session is handled by which application instance (that is, sticky sessions) and dispatches running sessions identified by a session cookie to a corresponding application instance. New sessions (that is, without a valid session cookie) are assigned by an algorithm (for example, round robin) to any available application instance.

After receiving the request from the Shutdown Coordinator 106, the Router/Load Balancer 104 removes Application Instance 3 114 from this list of available application instances, so no new sessions are created on Application Instance 3 114. However, a running session continues to be dispatched without a change (that is, requests to an application instance that is about to be shut down are still dispatched to the application instance, providing uninterrupted service during the handover process. From 1, method 100 proceeds to 2.

At 2, the Shutdown Coordinator 106 sends a request to Application Instance 3 114 that it is supposed to be shut down, instructing Application Instance 3 114 to export its sessions for handover. In the meantime, Application Instance 3 114 will not receive requests for new sessions as the Router/Load Balancer 104 will not assign new sessions to Application Instance 3 114, but Application Instance 3 114 will still receive requests for existing sessions that it will process until the handover for the specific session has started. This allows continuous processing, as exporting a huge number of sessions will take some time. From 2, method 100 proceeds to 3.

At 3, Application Instance 3 114 iterates over all its sessions and exports (for example, serially) the sessions to an External Session Storage 108. Requests for sessions for which an export has not been started yet are still processed. For other situations, refer to the following. From 3, method 100 proceeds to 4.

At 4, assuming that a request for a session for which handover (export) has already been started (or even completed) is received by the Router/Load Balancer 104 (for example, from a Client 102 for session ID=X and instance=3), the request is processed as usual, as the Router/Load Balancer 104 is not (and does not need to be) aware of the progress of session handovers. The Router/Load Balancer 104 operates on a presence of session IDs in session cookies and mapping to application instances. From 4, method 100 proceeds to 5.

At 5, the Router/Load Balancer 104 forwards the request to the original Application Instance 3 114 (that is, where the session used to be located). From 5, method 100 proceeds to 6.

At 6, when the Application Instance 3 114 receives the request for a session for which session handover has already been started (or even completed), Application Instance 3 114 can no longer process the request as it might affect session state, which would invalidate the (running or completed) session export. As a result, Application Instance 3 114 answers the request with a redirect request to the original address of the Router/Load Balancer, invalidating the session cookie, and setting a handover cookie. Application Instance 3 114 also specifies a retry-after value that indicates when the Client 102 should retry the request at the new (=old) address.

The retry-after value is an estimate of a duration it will still take to complete the export of the state of the session, assuming that the export needs to be completed before an import can start. If the Application Instance 3 114 and the External Session Storage 108 support streaming data, the retry-after can be set to zero. Also, if session export has already been completed, then the retry-after value is zero. The handover cookie contains the session identifier (ID) that identifies the original session and it is also used now as a key to export session state to the External Session Storage 108. From 6, method 100 proceeds to 7.

At 7, when the Client 102 receives the redirect request, the Client 102 waits for the duration specified by retry-after to allow the export of the session state to complete (that is, if retry-after is greater than zero). As this wait time happens on the client-side, it will not experience a timeout and will be fully aware of the small delay required for the session handover. For an end-user facing client, this could be visualized by a progress bar ("exporting . . . ") or other graphic indicator indicating a progressing/decreasing wait time.

After the wait time (or immediately, if retry-after equals zero), the Client 102 retries the request, directing the request to the address specified in the redirect request, which happens to be the same as the original address. This address points to the Router/Load Balancer 104 and identifies any instance of the application, but it is not specific to Application Instance 3 114, therefore the address does not change during a handover. However, the second request will not contain a session cookie, as this was invalidated with the redirect request. Instead, the request will carry a newly set handover cookie. From 7, method 100 proceeds to 8.

At 8, the Router/Load Balancer 104 receives the second request from the Client 102 and detects that no session cookie is set. By applying a regular load balancing algorithm (for example, round robin), the Router/Load Balancer 104 generates a new application instance to which the request should be dispatched (here, Application Instance 2 112). As the Shutdown Coordinator 106 had initially removed Application Instance 3 114 that is about to be shut down from the list of available instances, the determined application instance will necessarily be different than the original Application Instance 3 114. From 8, method 100 proceeds to 9.

At 9, Application Instance 2 112 has received the request and detected that no session cookie is present. Therefore, Application Instance 2 112 generates a new session and sets the session ID as a new session cookie. Application Instance 2 112 also detects a handover cookie and retrieves a key to the exported session state in the External Session Storage 108. Application Instance 2 112 imports the stored session state into the newly created session. In some implementations, the import can be performed by streaming data (if supported by Application Instance 2 112 and the External Session Storage 108), or Application Instance 2 112 needs to wait until the import from the External Session Storage 108 has been completed. In some implementations, a locking mechanism can be implemented in the External Session Storage 108 (for example, by defining a "ready"-type flag that is set in the External Session Storage 108 for the session state key that is set by the exporting application instance once the export has been completed). As the request to target Application Instance 2 112 has been delayed by the retry-after value, there is usually no wait time (or only minimal) until the External Session Storage 108 can be accessed.

Optionally, if the import of the stored session state takes a noticeable amount of time, the target application instance may be configured to send another redirect request to the client, with a retry-after value that is an estimate of the time it will take to import the stored session state. The redirect address is again the same as the original address, but this time the session cookie is already set to the new session ID and the handover cookie is invalidated (as the session state import has already been started). In this way, a Client 102 can again avoid experiencing a timeout, and can also visualize an expected delay to an end-user facing client by a progress bar ("importing . . . ") or other graphic indicator indicating a progressing/decreasing wait time. If the stored session state is small and an import can be performed quickly, this second redirect can be omitted. From 9, method 100 proceeds to 10.

At 10, once the target Application Instance 2 112 has completed the stored session state import, Application Instance 2 112 continues by processing the request as usual. When Application Instance 2 112 responds to the Client 102, it includes the new session ID in the session cookie that was created during the handover and invalidates the handover cookie (if not already done by a redirect as described as optional in 9). From 10, method 100 proceeds to 11.

At 11, the Router/Load Balancer 104 forwards the response to the Client 102. In doing so, the Router/Load Balancer 104 updates mapping between the session ID and Application Instance 2 112, making it a sticky session, which will ensure that further requests are again dispatched to Application Instance 2 112 as before (if this has not already been done by a redirect as described as optional in 9). From 11, method 100 proceeds to 12.

At 12, once Application Instance 3 114 has completed export of all associated sessions to the External Session Storage 108, Application Instance 3 114 reports back to the Shutdown Coordinator 106, indicating that no further requests can be processed as all sessions have been exported and that Application Instance 3 114 is ready to be shut down. From 12, method 100 proceeds to 13.

At 13, as there might still be sessions associated with the Application Instance 3 114 that is about to be shut down (if there were no recent requests that triggered the redirect as described by 4 to 11), the Shutdown Coordinator 106 calls the Router/Load Balancer 104 to complete a redirect for all remaining sessions still assigned to Application Instance 3 114. From this point onward, Router/Load Balancer 104 will respond to any request mapped to Application Instance 3 114 with a redirect, invalidating the session cookie, and adding a handover cookie copying the session ID from the original session cookie. The retry-after value is set to zero as the export of all sessions has already been completed. In other words, the Router/Load Balancer component takes over the procedure previously performed by the Application Instance 3 114 case-by-case only for sessions for which the session handover had already been started. As the export is complete, this can now be done by the Router/Load Balancer component unconditionally, relieving Application Instance 3 114 from this duty. From 13, method 100 proceeds to 14.

At 14, as the Router/Load Balancer 104 handles all further requests directed to Application Instance 3 114 (to be shut down), the Shutdown Coordinator 106 can now safely trigger a shutdown of Application Instance 3 114. From 14, method 100 proceeds to 15.

At 15, when a maximum session timeout has expired, the Shutdown Coordinator 106 deletes all remaining session exports from the External Session Storage 108. These are sessions for which no more requests from Clients 102 were received after a session handover was started. In some implementations, for identifying these sessions efficiently, the sessions may have been tagged with the ID of the application instance that was shut down when it exported its sessions to the External Session Storage 108. After 15, method 100 may stop.

Figure 2:
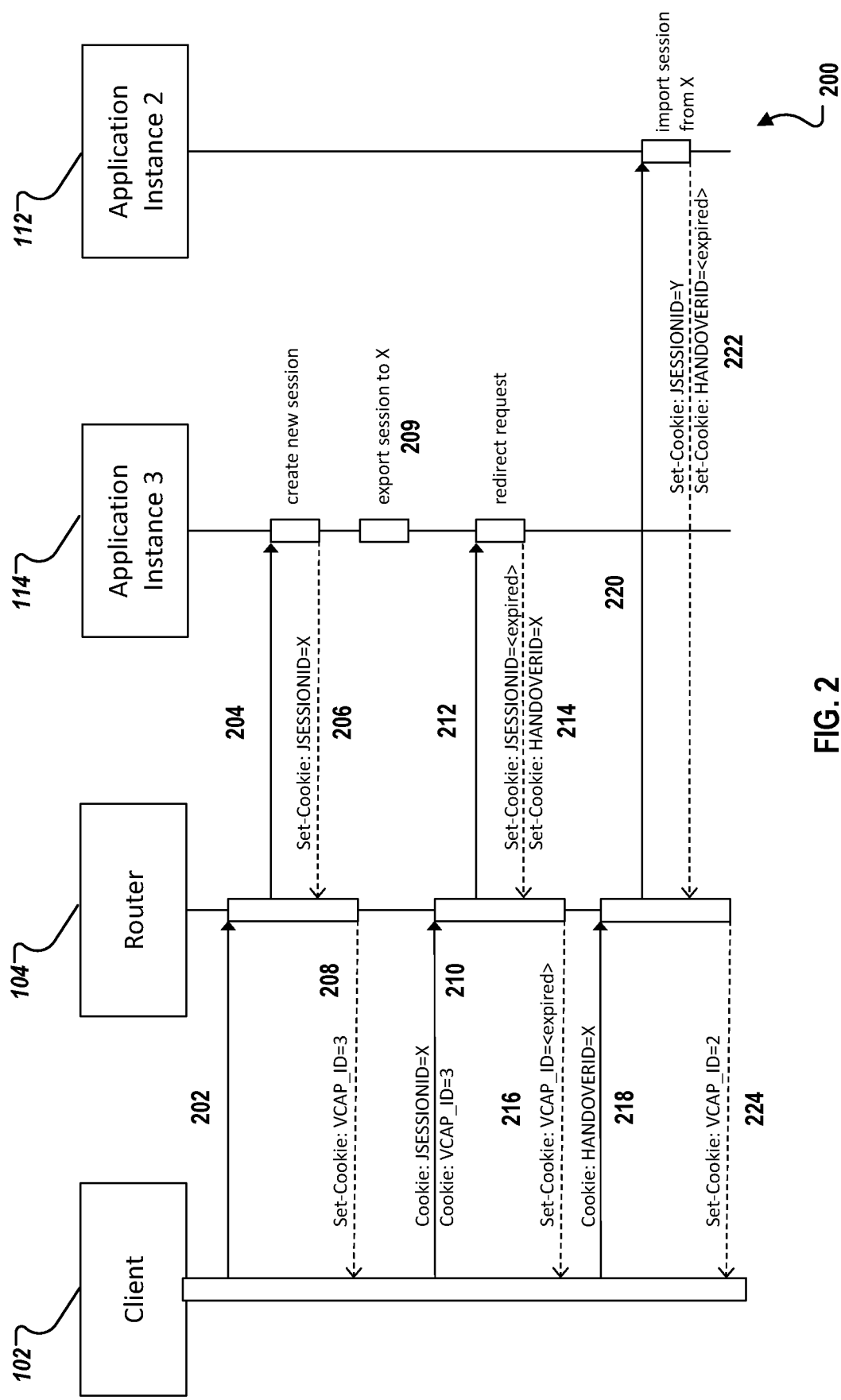
FIG. 2 is a swim diagram illustrating a request flow and involved cookies in a Cloud Foundry computing environment, according to an implementation of the present disclosure.

FIG. 2 is a swim diagram illustrating a request flow 200 and involved cookies in a Cloud Foundry computing environment, according to an implementation of the present disclosure. FIG. 2 illustrates involved components, including a client 102, Router 104 (for example, a Router/Load Balancer 104 as described in FIG. 1), Application Instance 2 112, and Application Instance 3 114. In the described example of FIG. 2, it is desired to shut down Application Instance 3 114.

For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

FIG. 2 illustrates an example of a request flow and involved cookies in a Cloud Foundry computing environment. Here, a map between session IDs and application instances is implemented as client-side cookies (that is, VCAP_ID is used to identify an application instance) that are introduced at the Router 104 level by inspecting session cookies (that is, JSESSIONID). This also explains why the Router 104 cannot simply change the map between session IDs and application instances, as the Router 104 does not possess this information locally (it is stored client-side). Therefore, the redirect mechanism is required to update settings at the Client 102, which is only possible on a next request sent by the Client 102 on its own schedule.

At 202, Client 102 sends a request to Router 104 for an application instance. From 202, method 200 proceeds to 204.

At 204, Router 104 receives the request from the Client 102 and detects that no session cookie is set. By applying a regular load balancing algorithm (for example, round robin), the Router 104 generates a new application instance to which the request should be dispatched (here, Application Instance 3 114) and forwards the request it has received to this application instance. From 204, method 200 proceeds to 206.

At 206, Application Instance 3 114 receives the request from the Router 104 and detects that no session cookie is present. Therefore, Application Instance 3 114 generates a new session and sets the session ID X as a new session cookie (JSESSIONID=X) and returns the cookie together with the application response to the Router 104. From 206, method 200 proceeds to 208.

At 208, Router 104 receives the response from Application Instance 3 114 and detects that a session cookie is present, indicating that the application has generated a session. Therefore, Router 104 sets the Application Instance 3 as a new VCAP_ID cookie (VCAP_ID=3), establishing a sticky session. It returns the session cookie and the VCAP_ID cookie together with the application response to Client 102. From 208, method 200 proceeds to 209.

At 209, Application Instance 3 114 exports session X to an External Session Storage (for example, an External Session Storage 108 as described in FIG. 1) as a consequence of having received a shutdown request from the Shutdown Coordinator 106 to export all of its sessions (not illustrated). From 209, method 200 proceeds to 210.

At 210, Client 102 sends a second request to Router 104 for an application instance. From 210, method 200 proceeds to 212.

At 212, Router 104 receives the request from the Client 102 and detects that a VCAP_ID cookie is set. Client 102 forwards the request it has received to the corresponding Application Instance 3 114. From 212, method 200 proceeds to 214.

At 214, Application Instance 3 114 receives the request from the Router 104 and detects that it had already exported the session X contained in the session cookie (JSESSIONID=X). Therefore, Application Instance 3 114 generates a handover cookie and sets the session ID X as a new handover cookie (HANDOVERID=X). Application Instance 3 114 also invalidates the session cookie by expiring it (JSESSIONID=<expired>) and returns the cookies together with a redirect request as a response to the Router 104. From 214, method 200 proceeds to 216.

At 216, Router 104 receives the response from Application Instance 3 114 and detects that the session cookie has been invalidated. Therefore, Router 104 invalidates the sticky session by expiring the VCAP_ID cookie (VCAP_ID=<expired>). Router 104 returns the expired session and VCAP_ID cookies and the handover cookie together with the application response to Client 102. From 216, method 200 proceeds to 218.

At 218, Client 102 follows the redirect request received as a response to its second request, and sends a third request to Router 104 for an application instance. As both session and VCAP_ID cookies were expired, this request contains only the handover cookie (HANDOVERID=X). From 218, method 200 proceeds to 220.

At 220, Router 104 receives the request from the Client 102 and detects that no session cookie is set. By applying a regular load balancing algorithm (for example, round robin), the Router 104 generates a new application instance to which the request should be dispatched (here, Application Instance 2 112) and forwards the request it has received to this application instance. From 220, method 200 proceeds to 222.

At 222, Application Instance 2 112 receives the request from the Router 104 and detects that no session cookie is present. Therefore, Application Instance 2 112 generates a new session and sets the session ID Y as a new session cookie (JSESSIONID=Y). Application Instance 2 112 also detects that a handover cookie (HANDOVERID=X) is present. Therefore, Application 2 112 imports session X into session Y. Application Instance 2 112 also invalidates the handover cookie by expiring it (HANDOVERID=<expired>) and returns the expired cookie together with a new session cookie and the application response to the Router 104. From 222, method 200 proceeds to 224.

At 224, Router 104 receives the response from Application Instance 2 112 and detects that a new session cookie is present, indicating that the application has generated a new session. Therefore, Router 104 sets the Application Instance 2 as a new VCAP_ID cookie (VCAP_ID=2), which establishes a new sticky session. Router 104 returns the session cookie and the VCAP_ID cookie together with the application response to Client 102. After 220, method 200 may stop.

Figure 3:
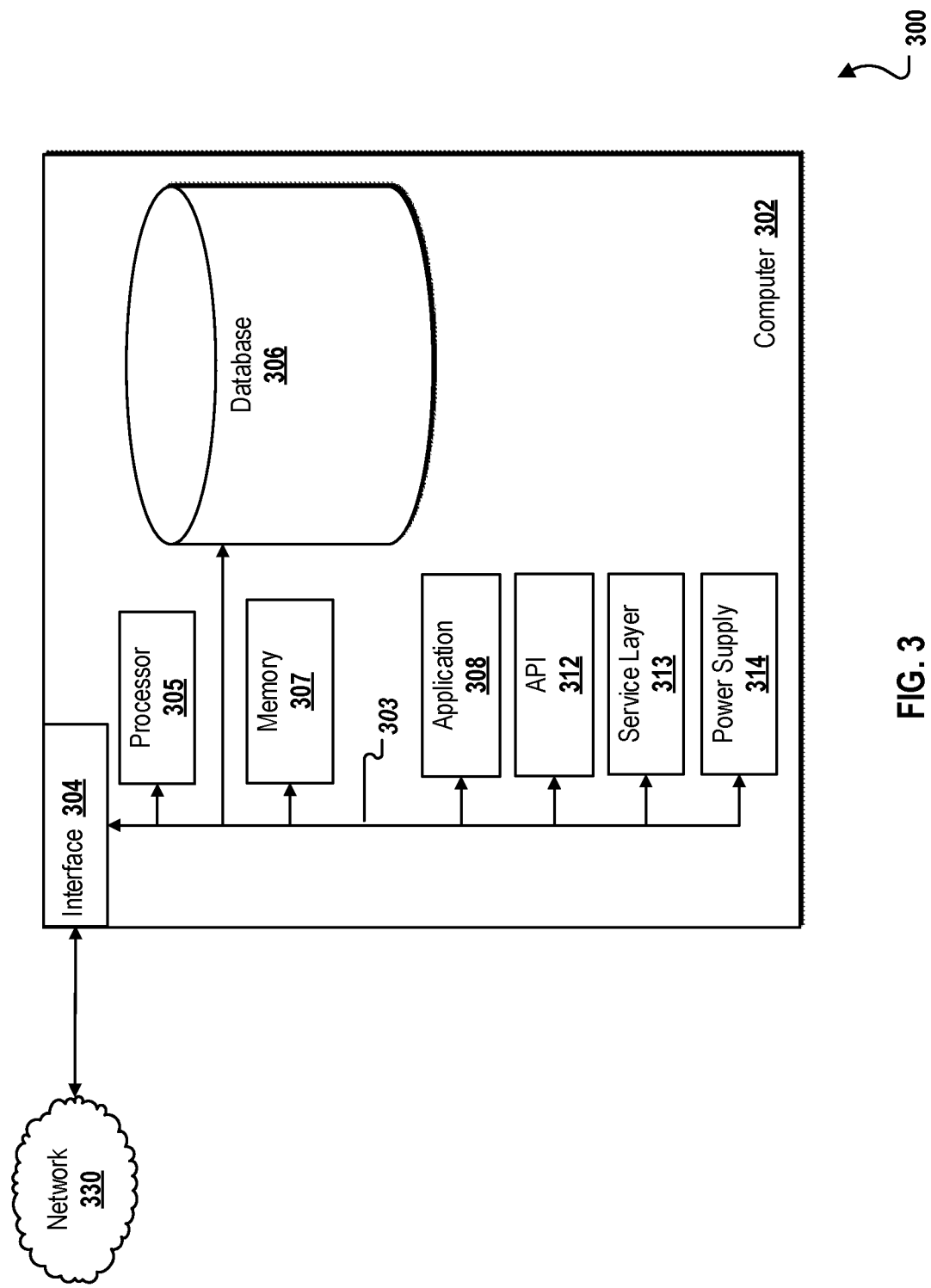
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 302 can include an input device, such as a keypad, keyboard, or touch screen, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as, for example, a client, network component, a server, or a database or another persistency, or a combination of roles for performing the subject matter described in the present disclosure. The illustrated Computer 302 is communicably coupled with a Network 330. In some implementations, one or more components of the Computer 302 can be configured to operate within an environment, or a combination of environments, including cloud-computing, local, or global.

At a high level, the Computer 302 is an electronic computing device operable to receive, transmit, process, store, or manage data and information associated with the described subject matter. According to some implementations, the Computer 302 can also include or be communicably coupled with a server, such as an application server, e-mail server, web server, caching server, or streaming data server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory or conventional database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302. Database 306 can hold, process, and supply any data type consistent with the described approach.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure.

Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: sending, by a shutdown coordinator and to a router, an instruction to no longer assign new sessions to an application instance, wherein the application instance is to be shut down; sending, by the shutdown coordinator and to the application instance a request to export associated sessions for handover to a new application instance; receiving, by the shutdown coordinator and from the application instance, an indication that no further requests can be processed by the application instance since all associated sessions have been exported to an external session storage; instructing, by the shutdown coordinator and to the router, to redirect requests to the application instance to the new application instance; shutting down, by the shutdown coordinator, the application instance; and deleting, by the shutdown coordinator, remaining sessions of all associated sessions from the external session storage after a defined timeout period.

The foregoing and other described implementations can each, optionally, include one or more of the following features:

A first feature, combinable with any of the following features, comprising removing, by the router, the application instance from a list of available application instances to prevent new sessions from creation on the application instance.

A second feature, combinable with any of the previous or following features, comprising: iterating, by the application instance, over all sessions to create exportable sessions; and exporting the exportable sessions to the external session storage.

A third feature, combinable with any of the previous or following features, comprising: receiving, by the router and from a client a request with a session identifier (ID) and identification of the application instance; and forwarding, from the router and to the application instance, the request; responding, by the application instance and to the router, with a redirect request containing an original address to the router, an invalidated session cookie, a handover cookie containing the session ID, and a retry-after value indicating when the client should retry the request; and sending, from the router and to the client, the redirect request.

A fourth feature, combinable with any of the previous or following features, comprising: waiting, by the client, a duration specified by the retry-after value to allow an export of a session state from the application instance to the external session storage to complete; retrying, by the client and to the router as a new request, the request, wherein the request does not contain a session cookie and contains a new handover cookie with a value of the handover cookie; receiving, by the router and from the client, the new request; detecting, by the router, that the new request does not contain a session cookie; and generating, by the router, a new application instance with which to dispatch the new request.

A fifth feature, combinable with any of the previous or following features, comprising: receiving, by the new application instance and from the router, the new request; detecting, by the new application instance, that no session cookie is present; generating, by the new application instance, a new session; setting, by the new application instance, a new session cookie with a new session ID identifying the new session; detecting, by the new application instance, a presence of a new handover cookie; retrieving, by the new application instance and using the new handover cookie, the session ID contained in the new handover cookie; and importing a stored session state associated with the application instance into the new session.

A sixth feature, combinable with any of the previous or following features, comprising: processing, by the new application instance, the new request; responding, by the new application instance and to the router, with a new response, the new response including the new session ID in the new session cookie and the new handover cookie with an invalidated state; forwarding, by the router and to the client, the new response; and updating, by the router as a sticky session, a map between the new session ID and the new application instance.

In a second implementation, a non-transitory, computer-readable medium storing one or more instructions executable by a computer system to perform operations comprising: sending, by a shutdown coordinator and to a router, an instruction to no longer assign new sessions to an application instance, wherein the application instance is to be shut down; sending, by the shutdown coordinator and to the application instance a request to export associated sessions for handover to a new application instance; receiving, by the shutdown coordinator and from the application instance, an indication that no further requests can be processed by the application instance since all associated sessions have been exported to an external session storage; instructing, by the shutdown coordinator and to the router, to redirect requests to the application instance to the new application instance; shutting down, by the shutdown coordinator, the application instance; and deleting, by the shutdown coordinator, remaining sessions of all associated sessions from the external session storage after a defined timeout period.

The foregoing and other described implementations can each, optionally, include one or more of the following features:

A first feature, combinable with any of the following features, comprising one or more instructions executable by a computer system to perform operations for removing, by the router, the application instance from a list of available application instances to prevent new sessions from creation on the application instance.

A second feature, combinable with any of the previous or following features, comprising one or more instructions executable by a computer system to perform operations for: iterating, by the application instance, over all sessions to create exportable sessions; and exporting the exportable sessions to the external session storage.

A third feature, combinable with any of the previous or following features, comprising one or more instructions executable by a computer system to perform operations for: receiving, by the router and from a client a request with a session identifier (ID) and identification of the application instance; forwarding, from the router and to the application instance, the request; responding, by the application instance and to the router, with a redirect request containing an original address to the router, an invalidated session cookie, a handover cookie containing the session ID, and a retry-after value indicating when the client should retry the request; and sending, from the router and to the client, the redirect request.

A fourth feature, combinable with any of the previous or following features, comprising one or more instructions executable by a computer system to perform operations for: waiting, by the client, a duration specified by the retry-after value to allow an export of a session state from the application instance to the external session storage to complete; retrying, by the client and to the router as a new request, the request, wherein the request does not contain a session cookie and contains a new handover cookie with a value of the handover cookie; receiving, by the router and from the client, the new request; detecting, by the router, that the new request does not contain a session cookie; and generating, by the router, a new application instance with which to dispatch the new request.

A fifth feature, combinable with any of the previous or following features, comprising one or more instructions executable by a computer system to perform operations for: receiving, by the new application instance and from the router, the new request; detecting, by the new application instance, that no session cookie is present; generating, by the new application instance, a new session; setting, by the new application instance, a new session cookie with a new session ID identifying the new session; detecting, by the new application instance, a presence of a new handover cookie; retrieving, by the new application instance and using the new handover cookie, the session ID contained in the new handover cookie; and importing a stored session state associated with the application instance into the new session.

A sixth feature, combinable with any of the previous or following features, comprising one or more instructions executable by a computer system to perform operations for: processing, by the new application instance, the new request; responding, by the new application instance and to the router, with a new response, the new response including the new session ID in the new session cookie and the new handover cookie with an invalidated state; forwarding, by the router and to the client, the new response; and updating, by the router as a sticky session, a map between the new session ID and the new application instance.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: sending, by a shutdown coordinator and to a router, an instruction to no longer assign new sessions to an application instance, wherein the application instance is to be shut down; sending, by the shutdown coordinator and to the application instance a request to export associated sessions for handover to a new application instance; receiving, by the shutdown coordinator and from the application instance, an indication that no further requests can be processed by the application instance since all associated sessions have been exported to an external session storage; instructing, by the shutdown coordinator and to the router, to redirect requests to the application instance to the new application instance; shutting down, by the shutdown coordinator, the application instance; and deleting, by the shutdown coordinator, remaining sessions of all associated sessions from the external session storage after a defined timeout period.

The foregoing and other described implementations can each, optionally, include one or more of the following features:

A first feature, combinable with any of the following features, comprising one or more instructions that, when executed by the one or more computers, perform one or more operations for removing, by the router, the application instance from a list of available application instances to prevent new sessions from creation on the application instance.

A second feature, combinable with any of the previous or following features, comprising one or more instructions that, when executed by the one or more computers, perform one or more operations for: iterating, by the application instance, over all sessions to create exportable sessions; and exporting the exportable sessions to the external session storage.

A third feature, combinable with any of the previous or following features, comprising one or more instructions that, when executed by the one or more computers, perform one or more operations for: receiving, by the router and from a client a request with a session identifier (ID) and identification of the application instance; forwarding, from the router and to the application instance, the request; responding, by the application instance and to the router, with a redirect request containing an original address to the router, an invalidated session cookie, a handover cookie containing the session ID, and a retry-after value indicating when the client should retry the request; and sending, from the router and to the client, the redirect request.

A fourth feature, combinable with any of the previous or following features, comprising one or more instructions that, when executed by the one or more computers, perform one or more operations for: waiting, by the client, a duration specified by the retry-after value to allow an export of a session state from the application instance to the external session storage to complete; retrying, by the client and to the router as a new request, the request, wherein the request does not contain a session cookie and contains a new handover cookie with a value of the handover cookie; receiving, by the router and from the client, the new request; detecting, by the router, that the new request does not contain a session cookie; and generating, by the router, a new application instance with which to dispatch the new request.

A fifth feature, combinable with any of the previous or following features, comprising one or more instructions that, when executed by the one or more computers, perform one or more operations for: receiving, by the new application instance and from the router, the new request; detecting, by the new application instance, that no session cookie is present; generating, by the new application instance, a new session; setting, by the new application instance, a new session cookie with a new session ID identifying the new session; detecting, by the new application instance, a presence of a new handover cookie; retrieving, by the new application instance and using the new handover cookie, the session ID contained in the new handover cookie; and importing a stored session state associated with the application instance into the new session.

A sixth feature, combinable with any of the previous or following features, comprising one or more instructions that, when executed by the one or more computers, perform one or more operations for: processing, by the new application instance, the new request; responding, by the new application instance and to the router, with a new response, the new response including the new session ID in the new session cookie and the new handover cookie with an invalidated state; forwarding, by the router and to the client, the new response; and updating, by the router as a sticky session, a map between the new session ID and the new application instance.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
sending, by a shutdown coordinator and to a router, an instruction to no longer assign new sessions to an application instance, wherein the application instance is to be shut down;
sending, by the shutdown coordinator and to the application instance a request to export associated sessions for handover to a new application instance;
receiving, by the shutdown coordinator and from the application instance, an indication that no further requests can be processed by the application instance since all associated sessions have been exported to an external session storage;
instructing, by the shutdown coordinator and to the router, to redirect requests to the application instance to the new application instance;
shutting down, by the shutdown coordinator, the application instance; and
deleting, by the shutdown coordinator, remaining sessions of all associated sessions from the external session storage after a defined timeout period.

2. The computer-implemented method of claim 1, comprising removing, by the router, the application instance from a list of available application instances to prevent new sessions from creation on the application instance.

3. The computer-implemented method of claim 1, comprising:
iterating, by the application instance, over all sessions to create exportable sessions; and
exporting the exportable sessions to the external session storage.

4. The computer-implemented method of claim 1, comprising:
receiving, by the router and from a client a request with a session identifier (ID) and identification of the application instance;
forwarding, from the router and to the application instance, the request;
responding, by the application instance and to the router, with a redirect request containing an original address to the router, an invalidated session cookie, a handover cookie containing the session ID, and a retry-after value indicating when the client should retry the request; and
sending, from the router and to the client, the redirect request.

5. The computer-implemented method of claim 4, comprising:
waiting, by the client, a duration specified by the retry-after value to allow an export of a session state from the application instance to the external session storage to complete;
retrying, by the client and to the router as a new request, the request, wherein the request does not contain a session cookie and contains a new handover cookie with a value of the handover cookie;
receiving, by the router and from the client, the new request;
detecting, by the router, that the new request does not contain a session cookie; and
generating, by the router, a new application instance with which to dispatch the new request.

6. The computer-implemented method of claim 5, comprising:
receiving, by the new application instance and from the router, the new request;
detecting, by the new application instance, that no session cookie is present;
generating, by the new application instance, a new session;
setting, by the new application instance, a new session cookie with a new session ID identifying the new session;
detecting, by the new application instance, a presence of a new handover cookie;
retrieving, by the new application instance and using the new handover cookie, the session ID contained in the new handover cookie; and
importing a stored session state associated with the application instance into the new session.

7. The computer-implemented method of claim 6, comprising:
processing, by the new application instance, the new request;
responding, by the new application instance and to the router, with a new response, the new response including the new session ID in the new session cookie and the new handover cookie with an invalidated state;
forwarding, by the router and to the client, the new response; and
updating, by the router as a sticky session, a map between the new session ID and the new application instance.

8. A non-transitory, computer-readable medium storing one or more instructions executable by a computer system to perform operations comprising:
sending, by a shutdown coordinator and to a router, an instruction to no longer assign new sessions to an application instance, wherein the application instance is to be shut down;
sending, by the shutdown coordinator and to the application instance a request to export associated sessions for handover to a new application instance;
receiving, by the shutdown coordinator and from the application instance, an indication that no further requests can be processed by the application instance since all associated sessions have been exported to an external session storage;
instructing, by the shutdown coordinator and to the router, to redirect requests to the application instance to the new application instance;
shutting down, by the shutdown coordinator, the application instance; and
deleting, by the shutdown coordinator, remaining sessions of all associated sessions from the external session storage after a defined timeout period.

9. The non-transitory, computer-readable medium of claim 8, comprising one or more instructions executable by a computer system to perform operations for removing, by the router, the application instance from a list of available application instances to prevent new sessions from creation on the application instance.

10. The non-transitory, computer-readable medium of claim 8, comprising one or more instructions executable by a computer system to perform operations for:
iterating, by the application instance, over all sessions to create exportable sessions; and
exporting the exportable sessions to the external session storage.

11. The non-transitory, computer-readable medium of claim 8, comprising one or more instructions executable by a computer system to perform operations for:
- receiving, by the router and from a client a request with a session identifier (ID) and identification of the application instance;
- forwarding, from the router and to the application instance, the request;
- responding, by the application instance and to the router, with a redirect request containing an original address to the router, an invalidated session cookie, a handover cookie containing the session ID, and a retry-after value indicating when the client should retry the request; and
- sending, from the router and to the client, the redirect request.

12. The non-transitory, computer-readable medium of claim 11, comprising one or more instructions executable by a computer system to perform operations for:
- waiting, by the client, a duration specified by the retry-after value to allow an export of a session state from the application instance to the external session storage to complete;
- retrying, by the client and to the router as a new request, the request, wherein the request does not contain a session cookie and contains a new handover cookie with a value of the handover cookie;
- receiving, by the router and from the client, the new request;
- detecting, by the router, that the new request does not contain a session cookie; and
- generating, by the router, a new application instance with which to dispatch the new request.

13. The non-transitory, computer-readable medium of claim 12, comprising one or more instructions executable by a computer system to perform operations for:
- receiving, by the new application instance and from the router, the new request;
- detecting, by the new application instance, that no session cookie is present;
- generating, by the new application instance, a new session;
- setting, by the new application instance, a new session cookie with a new session ID identifying the new session;
- detecting, by the new application instance, a presence of a new handover cookie;
- retrieving, by the new application instance and using the new handover cookie, the session ID contained in the new handover cookie; and
- importing a stored session state associated with the application instance into the new session.

14. The non-transitory, computer-readable medium of claim 13, comprising one or more instructions executable by a computer system to perform operations for:
- processing, by the new application instance, the new request;
- responding, by the new application instance and to the router, with a new response, the new response including the new session ID in the new session cookie and the new handover cookie with an invalidated state;
- forwarding, by the router and to the client, the new response; and
- updating, by the router as a sticky session, a map between the new session ID and the new application instance.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
- sending, by a shutdown coordinator and to a router, an instruction to no longer assign new sessions to an application instance, wherein the application instance is to be shut down;
- sending, by the shutdown coordinator and to the application instance a request to export associated sessions for handover to a new application instance;
- receiving, by the shutdown coordinator and from the application instance, an indication that no further requests can be processed by the application instance since all associated sessions have been exported to an external session storage;
- instructing, by the shutdown coordinator and to the router, to redirect requests to the application instance to the new application instance;
- shutting down, by the shutdown coordinator, the application instance; and
- deleting, by the shutdown coordinator, remaining sessions of all associated sessions from the external session storage after a defined timeout period.

16. The non-transitory, computer-readable medium of claim 15, comprising one or more instructions that, when executed by the one or more computers, perform one or more operations for removing, by the router, the application instance from a list of available application instances to prevent new sessions from creation on the application instance.

17. The computer-implemented system of claim 15, comprising one or more instructions that, when executed by the one or more computers, perform one or more operations for:
- iterating, by the application instance, over all sessions to create exportable sessions; and
- exporting the exportable sessions to the external session storage.

18. The computer-implemented system of claim 15, comprising one or more instructions that, when executed by the one or more computers, perform one or more operations for:
- receiving, by the router and from a client a request with a session identifier (ID) and identification of the application instance;
- forwarding, from the router and to the application instance, the request;
- responding, by the application instance and to the router, with a redirect request containing an original address to the router, an invalidated session cookie, a handover cookie containing the session ID, and a retry-after value indicating when the client should retry the request; and
- sending, from the router and to the client, the redirect request.

19. The computer-implemented system of claim 18, comprising one or more instructions that, when executed by the one or more computers, perform one or more operations for:
- waiting, by the client, a duration specified by the retry-after value to allow an export of a session state from the application instance to the external session storage to complete;
- retrying, by the client and to the router as a new request, the request, wherein the request does not contain a session cookie and contains a new handover cookie with a value of the handover cookie;

receiving, by the router and from the client, the new request;

detecting, by the router, that the new request does not contain a session cookie; and generating, by the router, a new application instance with which to dispatch the new request.

20. The computer-implemented system of claim 19, comprising one or more instructions that, when executed by the one or more computers, perform one or more operations for:

receiving, by the new application instance and from the router, the new request;

detecting, by the new application instance, that no session cookie is present;

generating, by the new application instance, a new session;

setting, by the new application instance, a new session cookie with a new session ID identifying the new session;

detecting, by the new application instance, a presence of a new handover cookie;

retrieving, by the new application instance and using the new handover cookie, the session ID contained in the new handover cookie; and importing a stored session state associated with the application instance into the new session.

* * * * *